(12) United States Patent
Ou et al.

(10) Patent No.: US 9,234,076 B2
(45) Date of Patent: Jan. 12, 2016

(54) METHOD FOR PREPARING COPOLYESTER-ETHER FILM

(71) Applicant: Far Eastern New Century Corporation, Taipei (TW)

(72) Inventors: Fu-Wen Ou, Zhongli (TW); Ro-Ben Kuo, Zhongli (TW)

(73) Assignee: FAR EASTERN NEW CENTURY CORPORATION, Taipei (TW)

(*) Notice: Subject to any disclaimer, the term of this patent is extended or adjusted under 35 U.S.C. 154(b) by 0 days.

(21) Appl. No.: 14/506,736

(22) Filed: Oct. 6, 2014

(65) Prior Publication Data

US 2015/0284508 A1  Oct. 8, 2015

(30) Foreign Application Priority Data

Apr. 2, 2014  (TW) .............................. 103112317 A

(51) Int. Cl.
    *C08G 63/66* (2006.01)
    *C08G 63/91* (2006.01)
    *C08G 63/668* (2006.01)
    *C08G 63/672* (2006.01)
    *C08L 67/02* (2006.01)

(52) U.S. Cl.
    CPC .............. *C08G 63/914* (2013.01); *C08G 63/66* (2013.01); *C08G 63/668* (2013.01); *C08G 63/672* (2013.01); *C08L 67/025* (2013.01)

(58) Field of Classification Search
    CPC .... C08G 63/66; C08G 63/668; C08G 63/672; C08G 63/914; C08L 67/025
    See application file for complete search history.

(56) References Cited

U.S. PATENT DOCUMENTS

| | | | | |
|---|---|---|---|---|
| 4,328,333 A | * | 5/1982 | Barbee et al. .................. | 528/301 |
| 6,380,290 B1 | | 4/2002 | Bonte et al. | |
| 6,670,429 B2 | | 12/2003 | Appelman et al. | |
| 7,795,320 B2 | | 9/2010 | Determan et al. | |
| 7,799,838 B2 | | 9/2010 | Vollenberg et al. | |
| 7,902,263 B2 | | 3/2011 | Agarwal et al. | |
| 8,088,834 B2 | * | 1/2012 | Agarwal et al. .................. | 521/40 |
| 8,110,609 B2 | | 2/2012 | Determan et al. | |

FOREIGN PATENT DOCUMENTS

| | | |
|---|---|---|
| EP | 2510039 | 6/2011 |
| TW | I232226 | 5/2005 |

OTHER PUBLICATIONS

English translation of abstract of TW I232226 (published May 11, 2005).

* cited by examiner

*Primary Examiner* — Robert Jones, Jr.
(74) *Attorney, Agent, or Firm* — McClure, Qualey & Rodack, LLP

(57) ABSTRACT

A method for preparing a copolyester-ether film is provided, wherein the method includes a recycled polyester is provided. Alcoholysis is performed by reacting the recycled polyester with a diol to form a first intermediate, wherein the molar ratio of the recycled polyester to the diol is 1:1.8-2.5. Transesterification is performed to the first intermediate to form a second intermediate, wherein the temperature of transesterification is between 190° C. and 230° C. A polyol is added to the second intermediate and polymerization is performed to form a copolyester-ether, wherein the weight percent of the polyol in the copolyester-ether is 24-55%. The copolyester-ether is manufactured into a flexible film.

9 Claims, 4 Drawing Sheets

METHOD FOR PREPARING COPOLYESTER-ETHER FILM

RELATED APPLICATIONS

This application claims priority to Taiwanese Application Serial Number 103112317, filed Apr. 2, 2014, which is herein incorporated by reference.

BACKGROUND

1. Field of Invention

The present invention relates to a method for preparing a copolyester-ether film. More particularly, the present invention relates to a method for preparing a thermoplastic copolyester-ether film from recycled polyester.

2. Description of Related Art

The basic molecular structure of thermoplastic copolyester-ether (or thermoplastic polyester elastomer, TPEE) includes a hard segment able to form crystalline regions, and a soft segment able to maintain the elasticity and flexibility of the copolyester-ether. The crystalline regions are formed by the orderly arranged hard segment. By changing the species and controlling the amount of the hard and soft segments, TPEE exhibits various physical properties. Therefore, there are several key factors in determining the physical properties of TPEE such as the molecular composition and structure of the hard and soft segments, the amount and molecular weight of monomers, and the ratios of the hard and soft segments in TPEE.

In general, polyesters capable of crystallization are candidates as hard segment, such as polyethylene terephthalate (PET), polytrimethylene terephthalate (PTT), and polybutylene terephthalate (PBT). Long-chain polyalkylene glycol is usually used as soft segment, such as polyethylene glycol (PEG) and polytetramethylene glycol (PTMEG). Currently, industrially produced TPEE mainly uses PBT as the hard segment and PTMEG as the soft segment, which is mostly applied in sports equipment, car interior materials, etc.

Concerning the characteristics of material, TPEE using PBT as the hard segment has faster crystallization rate, and thus provides better dimensional stability and shortens the process cycle in the applications of injection molding for manufacturing machine parts, such as automotive tubing and sheath of wire and cable. TPEE using PET as the hard segment is more heat resistant than TPEE using PBT as the hard segment because PET has a higher melting point. Though the crystallization rate is slower than PBT, it is easier for TPEE using PET as the hard segment to produce semi-crystalline domain in that PET includes short molecular chains of ethylene molecular segment. Therefore, the crystallization of TPEE is adjustable by the ethylene to control the crystallization ratio of the hard segment. Given the above, TPEE adjusts the rigidity of crystalline of the hard segment, the flexibility of the soft segment, and the freedom of movement of the molecular chain segment to achieve a balance between the ratio of the hard and soft segment, so as to provide the material with great elasticity and strength at the same time.

The conventional preparation of a copolyester-ether uses dimethyl terephthalate (DMT) and diol, such as butanediol (BG) to perform transesterification in the presence of a transesterification catalyst. However, there is difficulty in the conventional method that byproducts are also easily produced during transesterification, e.g. methanol and tetrahydrofuran (THF) of low-molecular-weight alcohols. The byproducts may cause side reactions or reverse reactions during transesterification, and lead to problems like uneven distribution of molecular weight of product and poor mechanical properties.

Taiwan Patent No. 1232226 discloses a method for preparing a copolyether ester, which applies a method similar with the above method in the art with difference of using a mixed catalyst of titanium(IV)-n-butoxide and magnesium acetate to replace the single titanium catalyst to reduce the reaction time of polycondensation. No disclosure of inhibiting side reactions in the art. U.S. Pat. Nos. 7,795,320 and 8,110,609 disclose a polytrimethylene ether ester block copolymer and a method for preparing the same respectively, and both use PET scrap as reactant. The techniques disclosed is to alcoholysis the PET scrap to form dimethyl terephthalate (DMT), and additional dimethyl dimethyl isophthalate (DMI) having similar molecular structure but lower melting point has to be added to improve the degree of transesterification. Afterwards, a polycondensation reaction is performed by reacting with polytetramethylene glycol (PTMEG) to form the polytrimethylene ether ester block copolymer. However, PTMEG will dissociate to tetrahydrofuran (THF) at high temperature, and THF may be harmful to humans and the environment. Therefore, the polytrimethylene ether ester block copolymer is not suitable for products, such as fabric film and foil for furniture supplies, in direct contact with human body. Moreover, the main chain of the molecular structure of PTMEG is a linear carbon chain with four carbon atoms, and the linear carbon chain is prone to have preferred crystallization orientation, and thus is suitable for injection molded or extrusion molded. The injection molding needs material having high crystallization speed to reduce the cycle time, and the extrusion molded also needs material to have characteristic of high crystallization speed. Therefore, the material characteristic of being prone to have preferred crystallization orientation is more suitable for injection molding or extrusion molding. However, the material which crystallized in preferred orientation too fast is not suitable for application of making a film by extension molding because during the extension molding, too-fast crystallization may cause problems like broken film or film with uneven thickness. In addition, it is difficult to make a film that fits the required thickness in fabric, in which the waterproof breathable film used in fabric usually has a thickness of about 20 μm. Moreover, U.S. Pat. No. 6,380,290 discloses an engineering plastics level thermoplastic segmented polyetherester copolymer having a melting point above 200° C. Aromatic amine thermo oxidative stabilizer is added to enhance the anti-oxidative properties to improve the weather-ability of the material. However, the flexibility of the polyetherester copolymer cannot be improved. U.S. Pat. No. 7,799,838 discloses a modified copolyetherester formed by physical blending. However, the flexibility of the copolyetherester cannot be improved either.

Accordingly, there is a need for a method for preparing a copolyester-ether film that has characteristics of both PBT and PET as the main structure of the hard segment to provide an adequate crystallization speed and the convenience of making a film by extension molding, so as to provide the film material with greatly improved flexibility. The material of the copolyester-ether film prepared by the method of the present invention applied in fabric clothing can be soft and comfortable to wear. Moreover, the method for preparing a copolyester-ether film of the present invention does not dissociate to harmful substances during the preparing process, which is environmentally friendly, and can be safely used in clothing that needs long-term contact with human body.

SUMMARY

The invention provides a method for preparing a copolyester-ether film, including a recycled polyester is provided.

Alcoholysis is performed by reacting the recycled polyester with a diol to form a first intermediate, wherein the molar ratio of the recycled polyester to the diol is 1:1.8-2.5. Transesterification is performed to the first intermediate to form a second intermediate, wherein the temperature of transesterification is between 190° C. to 230° C. A polyol is added to the second intermediate and polymerization is performed to form a copolyester-ether, wherein the weight percent of the polyol in the copolyester-ether is 24-55%. The copolyester-ether is manufactured into a flexible film.

In accordance with one embodiment of the present invention, the recycled polyester is remade from recyclable polyester undergoing an impurity removal process and a viscosity enhancing process, wherein the polyester may be polyethylene terephthalate (PET), polytrimethylene terephthalate (PTT), polybutylene terephthalate (PBT), or combinations thereof.

In accordance with one embodiment of the present invention, the diol includes two to ten carbon atoms. Preferably, the diol is C2-C10 aliphatic diol, such as 1,2-ethanediol, 1,2-propanediol, 1,3-propanediol, 1,4-butanediol, 1,5-pentanediol, 1,6-hexanediol, 1,7-heptanediol, 1,8-octanediol and cyclohexanedimethanol. In accordance with other embodiment of the present invention, the diol is derived from biomass resources.

In accordance with one embodiment of the present invention, the alcoholysis is performed at a temperature of 190-200° C. for 3-5 hours. The purpose of the alcoholysis is to cut off the molecular segment of the polyester. When the recycled polyester is PET, bis(2-hydroxyethyl) terephthalate (BHET) is formed after the alcoholysis. The terminal functional group of BHET is the functional group required in the subsequent step of transesterification. It is more beneficial to the degree of transesterification when having more of the functional groups. Furthermore, copolyester-ether with greater degree of transesterification can be manufactured into a copolyester-ether film with better properties.

In accordance with one embodiment of the present invention, the method further includes a step of removing excess diol by vacuum extraction after the transesterification.

In accordance with one embodiment of the present invention, the polyol is polyethylene glycol (PEG).

The method for preparing the copolyester-ether film of the present invention may include adding a catalyst to enhance the reaction rate. In accordance with one embodiment of the present invention, the transesterification further includes adding a transesterification catalyst, and the transesterification catalyst may be a titanium compound, a tin compound, an antimony compound, a monovalent metal compound, a divalent metal compound, or combinations thereof. In accordance with other embodiment of the present invention, the polymerization further includes adding a polymerization catalyst, and the polymerization catalyst may be an antimony compound, a germanium compound, a magnesium compound, a manganese compound, a phosphorus compound, a nitrogen compound, an organic peroxide, or combinations thereof.

The method for preparing the copolyester-ether film of the present invention may include adding an auxiliary additive having specific function to enhance other characteristic of the material of the copolyester-ether film. In accordance with one embodiment of the present invention, an antioxidant is added to enhance the thermo-stability of the material, and an ultraviolet (UV) absorber is added to enhance the UV resistance of the material.

The copolyester-ether formed by the method of the present invention has a melting point between 150° C. to 200° C. and a glass transition temperature between −40° C. to −20° C.

The copolyester-ether film prepared by the method of the present invention is a waterproof breathable flexible film, which has a Young's modulus of 60-210 MPa and a water vapor transmission rate of 600-6000 g/m$^2$/day.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
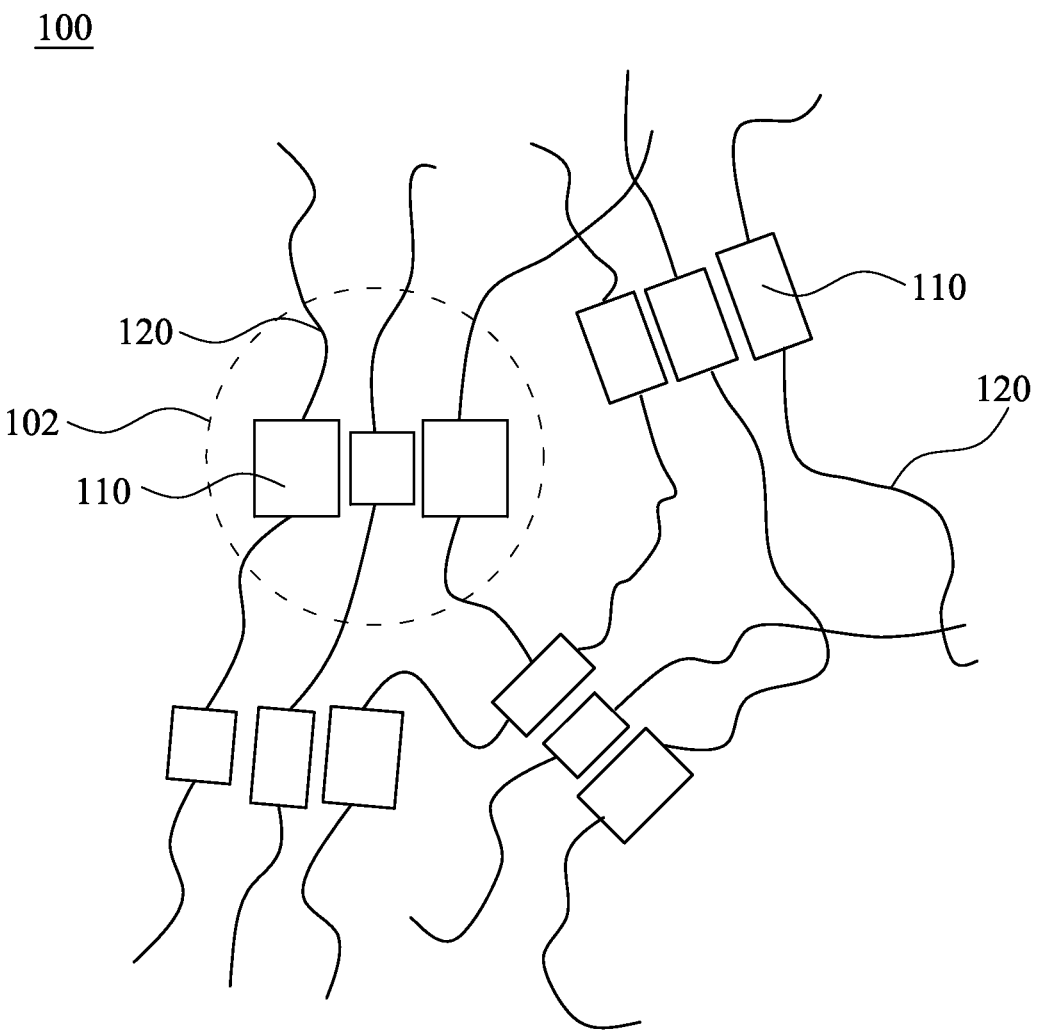
FIG. 1A is a schematic structure view of the hard and soft segment of a copolyester-ether formed by the method of the present invention.

The detailed description provided below is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Reference will now be made in detail to the present embodiments of the invention, examples of which are illustrated in the accompanying drawings. Wherever possible, the same reference numbers are used in the drawings and the description to refer to the same or like parts.

A method for preparing a copolyester-ether film is provided, especially for a method for preparing a thermoplastic copolyester-ether film from recycled polyester. The method of the present invention is a rapid one-shot reaction. Comparing to conventional method, the steps of the method of the present invention is easier and has more economic advantages. The method of the present invention includes a recycled polyester is provided. Alcoholysis is performed by reacting the recycled polyester with a diol to form a first intermediate, wherein the molar ratio of the recycled polyester to the diol is 1:1.8-2.5. The alcoholysis in the method of the present invention does not require refining and filtering process. The first intermediate is transesterified to form a second intermediate, wherein the temperature of transesterification is between 190° C. to 230° C. to avoid forming byproducts of low-molecular-weight alcohols during the transesterification. The second intermediate is polymerized with a polyol to form a copolyester-ether, wherein the weight percent of the polyol in the copolyester-ether is 24-55%. The copolyester-ether is manufactured into a flexible film.

In accordance with one embodiment of the present invention, the recycled polyester is remade from recyclable polyester undergoing an impurity removal process and a viscosity enhancing process, wherein the polyester may be polyethylene terephthalate (PET), polytrimethylene terephthalate (PTT), polybutylene terephthalate (PBT), or combinations thereof. The term "recyclable polyester" used herein represents recyclable products that the material is polyester.

In accordance with one embodiment of the present invention, the diol includes two to ten carbon atoms. Preferably, the diol is C2-C10 aliphatic diol, such as 1,2-ethanediol, 1,2-propanediol, 1,3-propanediol, 1,4-butanediol, 1,5-pentanediol, 1,6-hexanediol, 1,7-heptanediol, 1,8-octanediol and cyclohexanedimethanol. In accordance with other embodiment of the present invention, the diol is derived from biomass resources. The diol derived from biomass resources is made from plants to replace traditional petrochemical raw materials, which is benefit to reduce the demand for petroleum energy.

The starting reactant in the method of the present invention is the recycled polyester, and when the recycled polyester is PET, bis(2-hydroxyethyl) terephthalate (BHET) is formed after the alcoholysis to provide the functional group required in the subsequent step of transesterification. In accordance with one embodiment of the present invention, the alcoholysis is performed at a temperature of 190-200° C. for 3-5 hours.

In accordance with one embodiment of the present invention, the method further includes a step of removing excess diol by vacuum extraction after the transesterification.

In accordance with one embodiment of the present invention, the polyol is polyethylene glycol (PEG).

The method for preparing the copolyester-ether film of the present invention may include adding a catalyst to enhance the reaction rate. In accordance with one embodiment of the present invention, the transesterification further includes adding a transesterification catalyst, and the transesterification catalyst is a titanium compound, a tin compound, an antimony compound, a monovalent metal compound, a divalent metal compound, or combinations thereof. In accordance with other embodiment of the present invention, the polymerization further includes adding a polymerization catalyst, and the polymerization catalyst is an antimony compound, a germanium compound, a magnesium compound, a manganese compound, a phosphorus compound, a nitrogen compound, an organic peroxide, or combinations thereof.

The method for preparing the copolyester-ether film of the present invention may include adding an auxiliary additive having specific function to enhance other characteristic of the material of the copolyester-ether film. In accordance with one embodiment of the present invention, an antioxidant is added to enhance the thermostability of the material, and an ultraviolet (UV) absorber to enhance the UV resistance of the material.

The method for preparing the copolyester-ether film of the present invention applies polyester being recycled and remade as the raw material of the initial reaction. A diol is added to react with the recycled polyester to undergo alcoholysis. The purpose of the alcoholysis is to partially cut off the molecular segment of the polyester. When the recycled polyester is PET, the molecular segment of the PET is partially cut off to form bis(2-hydroxyethyl) terephthalate (BHET). The embodiment of the present invention applies a rapid one-shot reaction, has an easier process, and does not require refining and filtering process. Then, a transesterification catalyst is added while the transesterification. The purpose of the transesterification is to introduce a structure having different carbon number to partially replace the original structure of the hard segment of the abovementioned polyester. Therefore, the molecular structure of the hard segment includes two alkyl structures having different carbon numbers simultaneously, which results in the phase separation of the microcrystalline phase. When the phase separation of the microcrystalline phase is greater, the film with better breathable property can be obtained. However, if the separating of phase separation is too large to a certain extent, the tensile strength of the film becomes poor. Therefore, the phase separation should be maintained in a suitable range.

Figure 1B:
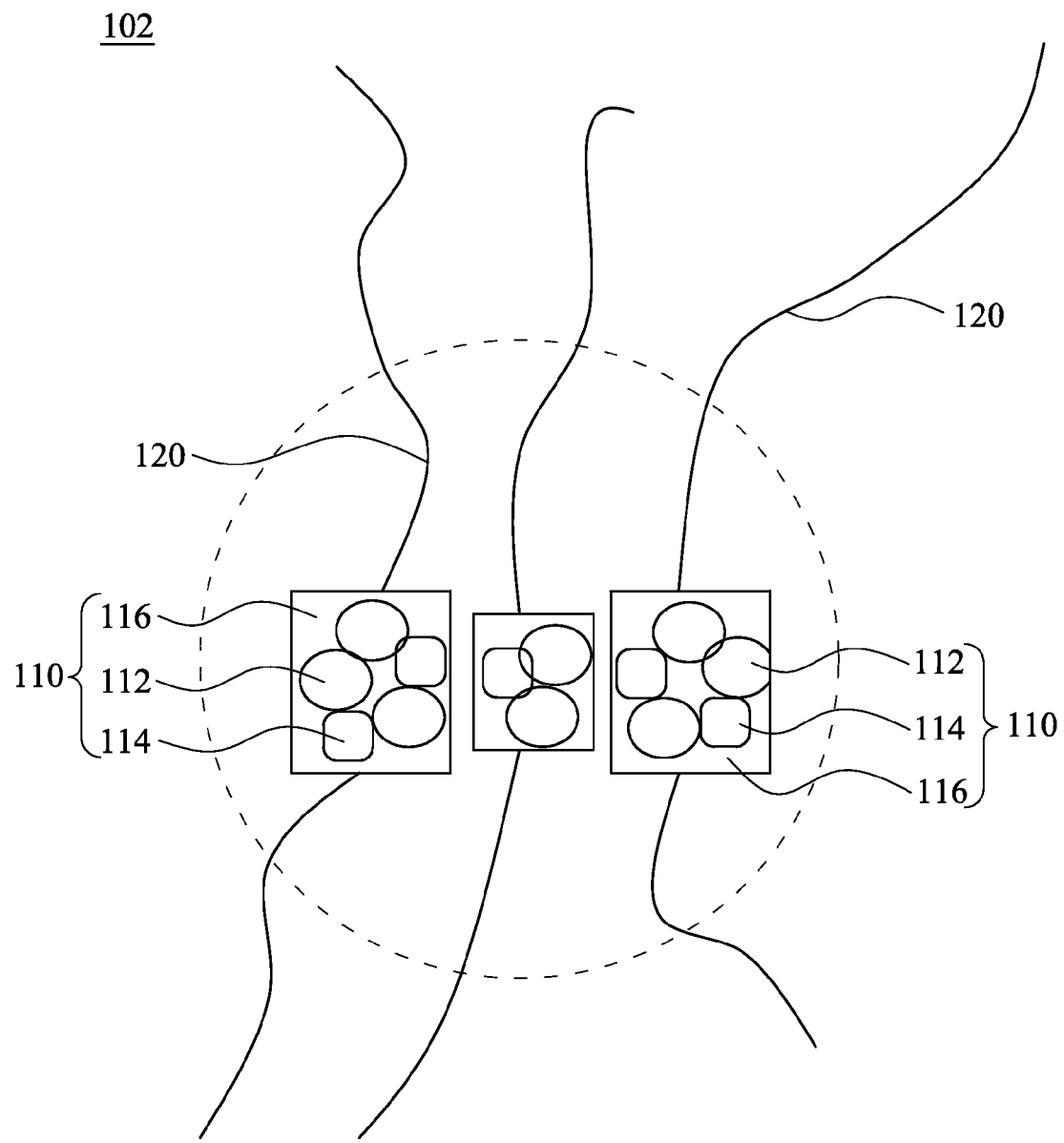
FIG. 1B is a microcosmic schematic view of crystalline region of the hard segment in FIG. 1A.

Referring to FIGS. 1A and 1B, FIG. 1A is a schematic structure view of the hard and soft segment of a copolyester-ether 100 formed by the method of the present invention, and FIG. 1B is a microcosmic schematic view 102 of crystalline region of the hard segment in FIG. 1A. The copolyester-ether 100 includes a hard segment crystalline region 110 and a soft segment molecule 120. The hard segment crystalline region 110 can form crystalline regions, and the soft segment molecule 120 can maintain the elasticity and flexibility of the copolyester-ether 100. Referring to FIG. 1B, the ordered structure of the hard segment crystalline region 110 includes structural arrangements of two microcrystalline phase regions 112 and 114 due to the presence of two kinds of alkyl molecules. Because the carbon numbers of the two microcrystalline phase regions 112 and 114 are different, there is a disordered amorphous region 116 spreading between two adjacent microcrystalline phase regions 112 and 114, and thus the ratio of the ordered structure in the overall crystalline phase is destroyed. Therefore, the change in the microcrystalline phase affects the properties of the material, and shifts the melting point toward lower temperature. Also, due to the joint effect of the phase separation of the microcrystalline phase, the glass transition temperature shifts toward lower temperature as well. Moreover, the change in the microcrystalline phase of the hard segment of the copolyester-ether increases the overall free volume, which makes the activity of the molecular chain in the hard segment more flexible, and thus having good elasticity and flexibility, which is benefit to the formability of preparing the film.

In accordance with one embodiment of the present invention, the recycled polyester is PET, the diol is 1,4-butanediol, and the polyol is PEG. In accordance with the abovementioned method for preparing the copolyester-ether film, segments of the ethanediol in the PET are partially cut off, and segments of the butanediol are introduced to partially replace the original segment structure. The molecular structure of the hard segment includes both ethoxy ($C_2H_4O$) segment and butoxy ($C_4H_6O$) segment simultaneously. The copolyester-ether has a melting point between 150° C. to 200° C. and a glass transition temperature between −40° C. to −20° C.

Dimethyl terephthalate (DMT) and butylene glycol (BG) are used to form copolyester-ether in conventional method, which the copolyester-ether includes butoxy segment as the main part of the hard segment, and polytetramethylene ether glycol (PTMEG) as the main part of the soft segment. When the copolyester-ether having this kind of hard and soft segment is manufactured into a film, the film lacks elasticity and flexibility, and the material of the film is stiff. Also, PTMEG will dissociate to tetrahydrofuran (THF) at high temperature, and there have been concerns that THF may be harmful to humans. In accordance with one embodiment of the present invention, the recycled PET is used as the starting reactant, and because the hard segment partially contains ethoxy structure, the film obtained has good elasticity and flexibility. In addition, the material of the copolyester-ether has good waterproof and breathable properties, and thus the film manufactured from the copolyester-ether is a waterproof breathable flexible film, which has a Young's modulus of 60-210 MPa and a water vapor transmission rate of 600-6000 g/m²/day.

The method to manufacture the film may be any conventional methods, such as melt extrusion and film blowing.

The detailed description provided below is intended as a description of the present examples and is not intended to represent the only forms in which the present example may be constructed or utilized. Therefore, the spirit and scope of the appended claims should not be limited to the description of the embodiments contained herein.

Chemical

The chemicals needed in the embodiments of the present invention are as following:
1. Recycled polyester (Polyethylene terephthalate, PET): Model: CFF-290 Recycle PET chip; Molecular weight for repeat unit: 192; and Supplier from Far Eastern New Century Corporation, TW.
2. 1,4-butanediol: Molecular weight: 92.
3. Polyethylene glycol (PEG): Molecular weight: 1000 and 2000.
4. Titanium(IV)-n-butoxide.
5. Antimony trioxide ($Sb_2O_3$).
6. Antioxidant: Model: IRGANIX 1010 and GA80.
7. UV absorber: Model: EVERSORB 761.

Test Items and Methods

The test items and methods for testing the properties of the material are as following:
1. Tensile testing: ASTM D42.
2. Water Vapor Transmission test: ASTM E96 BW and JIS L1099 A1.
3. Hydrostatic Pressure Test: JIS L1092.
4. Film texture test: Adopts human sensory evaluation by holding the film to be tested through repeated bending and flexing to provide the information of the hard and soft of the film texture.
5. NMR analysis: To prove that the hard segment of the copolyester-ether formed by the method of the present invention includes both structures of ethoxy segment and butoxy segment.

Embodiment 1

The method for preparing Embodiment 1 is as following:
1. Alcoholysis was performed by reacting 20 kg of recycled PET with 23.44 kg of 1,4-butanediol. The reaction was performed in a pilot reactor. The alcoholysis is performed at a temperature of 190-200° C. for 5 hours.
2. The temperature was continually heated to 230° C. A transesterification catalyst, titanium(IV)-n-butoxide, was added to perform transesterification. Butoxy ($C_4H_6O$) segment was partially introduced into the ethoxy ($C_2H_4O$) segment of the PET. The temperature of transesterification must be controlled below 230° C. to avoid 1,4-butanediol dissociating into THF under high reaction temperature.
3. After the degree of transesterification reached 95%, excess 1,4-butanediol was removed by vacuum extraction. Then, polymerization was performed in a polymerization tank at a temperature of 250° C. The beginning 2 hours of polymerization was maintained at normal atmospheric pressure. After there was no distillate on the top of the tank, 4 kg of polyethylene glycol (Molecular weight: 1000) was added. Also, a polymerization catalyst, antimony trioxide, was added to enhance the reaction rate of the polymerization. An antioxidant was added to enhance the thermostability of the material, and an UV absorber was added to enhance the UV resistance of the material. The polymerization tank was controlled at a pressure below 1 torr. The polymerization took about 5 hours. When the relative viscosity of the copolymer reached 2.3-3.55, the copolyester-ether was obtained.
4. The above copolyester-ether was manufactured into a 20-μm film. Embodiment 1 was obtained and tested.

Embodiment 2-4

The methods for preparing Embodiment 2-4 are substantially the same as Embodiment 1, but the conditions of the polyethylene glycol were changed to 6 kg of polyethylene glycol with a molecular weight of 1000, 10 kg of polyethylene glycol with a molecular weight of 1000, and 14 kg of polyethylene glycol with a molecular weight of 2000, respectively.

COMPARATIVE EXAMPLE

Comparative Example was prepared by conventional method, including:
1. Esterification: Esterification was performed by reacting 21.6 kg of Dimethyl terephthalate (DMT) and 11.7 kg of 1,4-butanediol with 8 kg of polyethylene glycol (Molecular weight: 1000). The reaction was performed in a pilot reactor. 16 kg of titanium(IV)-n-butoxide catalyst was added to avoid the pyrolysis of the reactant during esterification. Also, an antioxidant and an UV absorber were added. The temperature of esterification was set at 150° C. in the beginning, and was gradually heated.
2. Polymerization: When the temperature of esterification was heated to 220° C., the reaction time was about 6 hours, and the distillate of byproduct reached 6.7 kg, the intermediate, which had a degree of transesterification of 95%, was moved to a polymerization tank to undergo polymerization. The temperature of polymerization was set at 250° C. 24 g of antimony trioxide catalyst was added. The polymerization tank was controlled at a pressure below 1 torr. The polymerization took about 5 hours.
3. When the relative viscosity of the copolymer reached 2.3-3.55, Comparative Example was obtained and tested.

Table 1 shows the melting point (Tm), cold crystallization temperature (Tcc), and the glass transition temperature (Tg) of Embodiments 1-4 and Comparative Example measured by Differential scanning calorimeter (DSC). Table 1 also shows the NMR analysis result of Embodiments 1-4 and Comparative Example, wherein TPA represents terephthalic acid; DMT represents dimethyl terephthalate; EG represents ethoxy group; BG represents butoxy group; and PEG represents polyethylene glycol.

TABLE 1

| Sample | Tm (°C.) | Tcc (°C.) | Tg (°C.) | NMR analysis | | | | | | |
|---|---|---|---|---|---|---|---|---|---|---|
| | | | | TPA (DMT) | | EG | | BG | | PEG | |
| | | | | mole % | wt % | mole % | wt % | mole % | wt % | mole % | wt % |
| Embodiment 1 | 198 | 158 | −21 | 48.4 | 49.8 | 3.9 | 1.5 | 43.8 | 24.4 | 3.9 | 24.3 |
| Embodiment 2 | 192 | 154 | −28 | 48.1 | 48.4 | 7.5 | 2.8 | 39.4 | 21.4 | 4.5 | 27.5 |
| Embodiment 3 | 166 | 103 | −35 | 50.2 | 48.5 | 5.4 | 1.9 | 39.8 | 20.8 | 4.9 | 28.8 |
| Embodiment 4 | 155 | 90 | −40 | 50.0 | 34 | 12.5 | 3.1 | 31.5 | 11.6 | 6.25 | 51.2 |
| Comparative Example | 210 | 160 | −30 | 49.6 | 51 | 0 | 0 | 46.7 | 26 | 3.7 | 23 |

As shown in the foregoing Table 1, the hard segment of the copolyester-ether formed by the method of the present invention includes both ethoxy segment and butoxy segment, which results in the phase separation of the microcrystalline phase. All of the melting points of Embodiments 1-4 were smaller than 200° C., and all of the glass transition temperatures of Embodiments 1-4 were between −40° C. to −20° C. The NMR analysis results confirmed that Embodiments 1-4 included both ethoxy segment and butoxy segment.

Figure 2A:
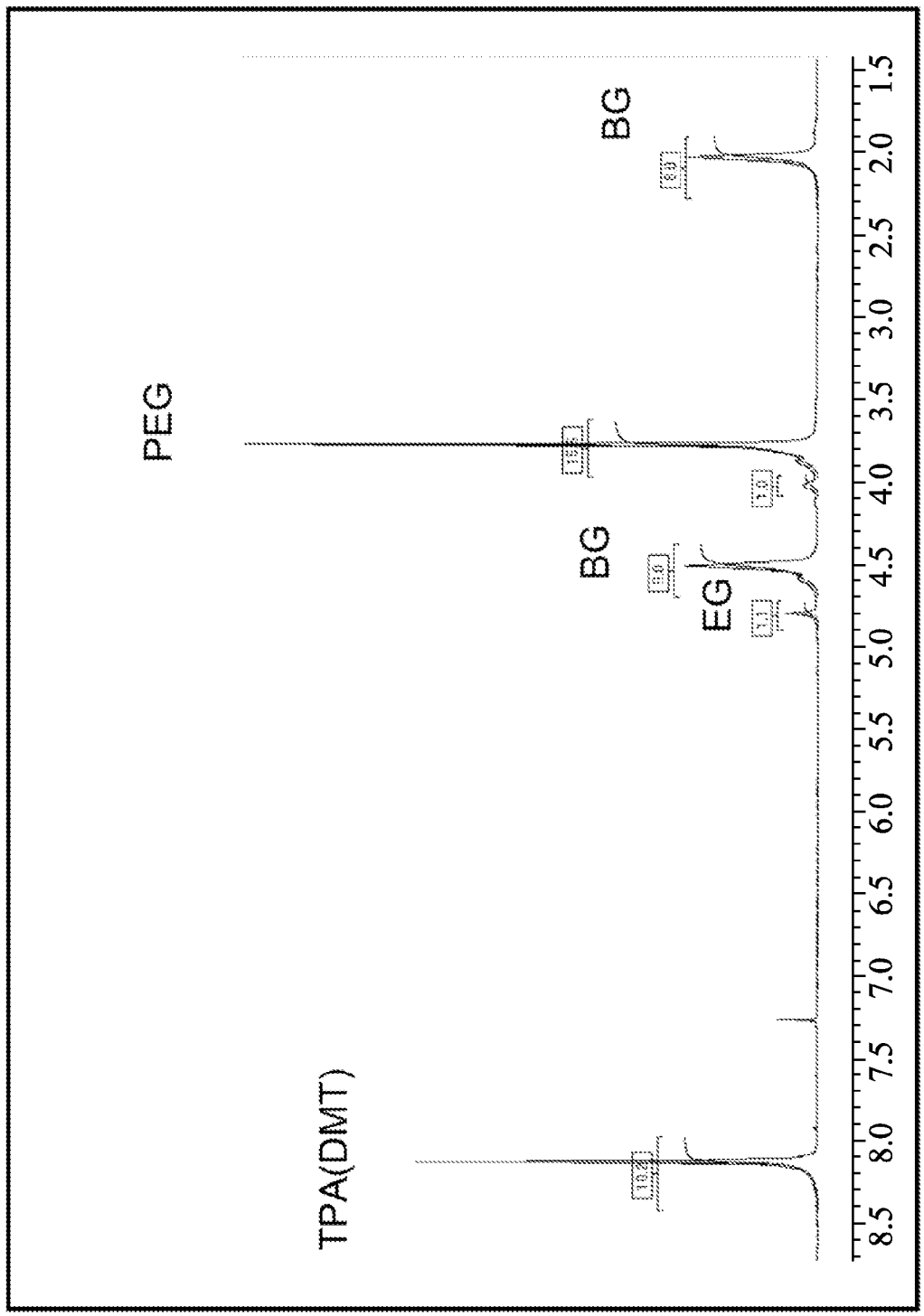
FIGS. 2A and 2B are nuclear magnetic resonance (NMR) spectra of an embodiment of the present invention and a comparative example respectively.
Figure 2B:
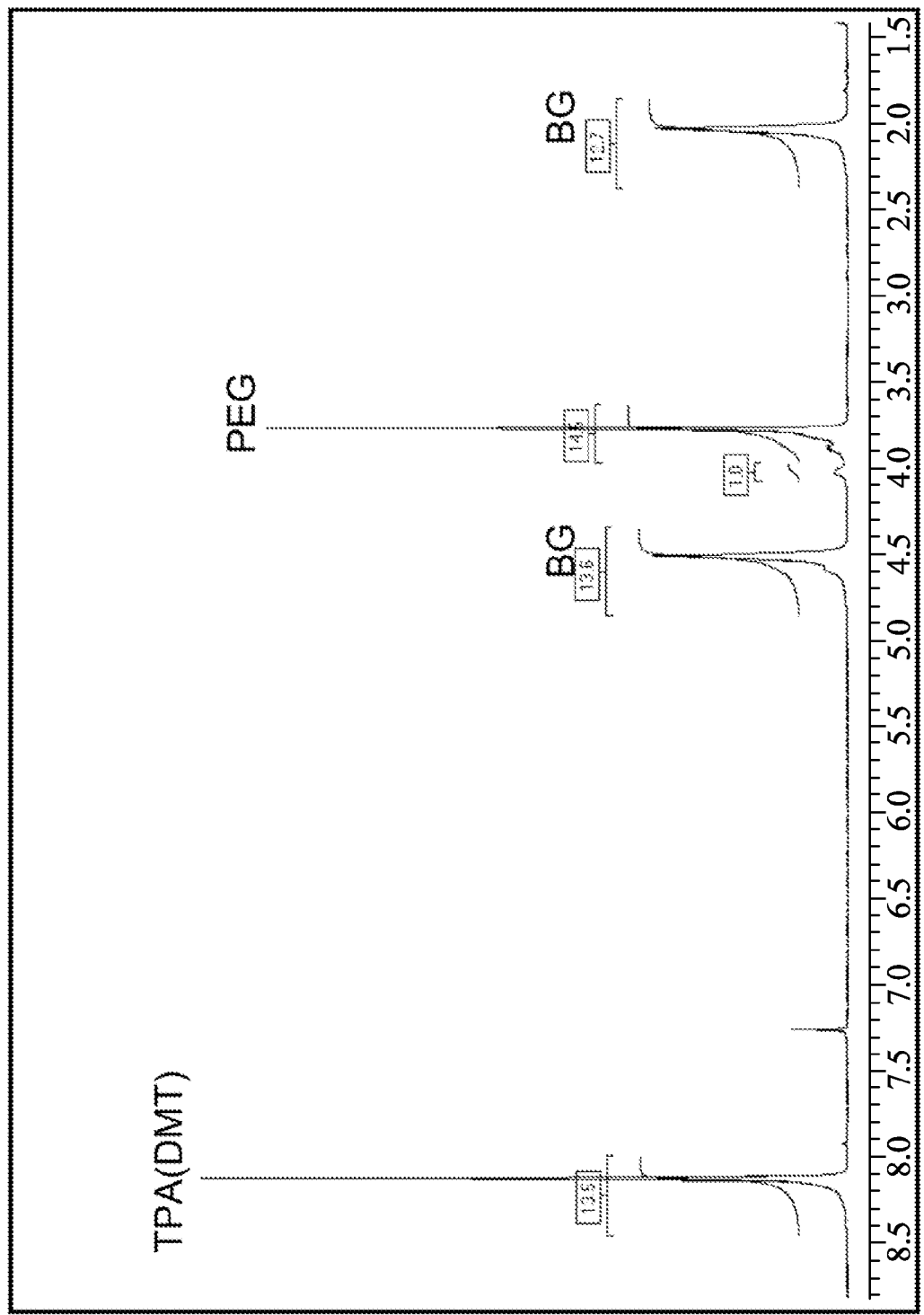

Referring to FIGS. 2A and 2B, which are NMR spectra of Embodiment 1 and Comparative Example respectively. FIG. 2A shows that the hard segment of Embodiment 1 included both ethoxy segment and butoxy segment. FIG. 2B shows that the hard segment of Comparative Example only included butoxy segment.

Table 2 shows the results of tensile testing, Young's modulus, water vapor transmission test, hydrostatic pressure test, and film texture test of Embodiments 1-4 and Comparative Example. Young's modulus is an elastic modulus. Materials having greater Young's modulus are stiffer, brittler, and more inflexible, while materials having smaller Young's modulus are softer and more flexible. In this embodiment, Young's modulus was used to represent the elasticity, flexibility and texture of the film obtained.

TABLE 2

| Sample | Tensile strength (MPa) | Young's modulus (MPa) | Water Vapor Transmission (g/m²/day) | | Hydrostatic Pressure (mm H₂O) JISL11092 | Film texture |
|---|---|---|---|---|---|---|
| | | | ASTM | JIS | | |
| Embodiment 1 | 30 | 180 | 600 | 800 | 25000 | good |
| Embodiment 2 | 28 | 150 | 1000 | 1500 | 20000 | good |
| Embodiment 3 | 24 | 100 | 4000 | 3000 | 20000 | good |
| Embodiment 4 | 22 | 60 | 6000 | 5000 | 15000 | good |
| Comparative Example | 30 | 220 | 900 | 1500 | 20000 | poor |

As shown in the foregoing Table 2, Young's modulus of Embodiments 1-4 were smaller comparing to Comparative Example, which represents that the copolyester-ether formed by the method of the present invention had good elasticity and flexibility, and copolyester-ether film obtained had a softer texture than Comparative Example. Embodiments 1-4 were formed by adding different ratio and molecular weight of polyethylene glycol, and polyethylene glycol was the main structure of the soft segment. Therefore, copolyester-ether having different elasticity and flexibility can be formed by controlling the ratio of hard and soft segment. Moreover, the results of water vapor transmission test and hydrostatic pressure test shows that the copolyester-ether film manufactured by the method of the present invention can be waterproof and breathable at the same time.

Given the above, the method for preparing the copolyester-ether film of the present invention applies polyester and diol to perform alcoholysis that partially introduce the diol into the polyester as the hard segment of the copolyester-ether to change the microcrystalline phase of the hard segment of the copolyester-ether and increase the overall free volume. Therefore, the activity of the molecular chain in the hard segment is more flexible, and thus having good elasticity and flexibility, which is benefit to the formability during hot-drawing of the film. The copolyester-ether formed has a melting point below 200° C., and thus the material can be heated evenly and completely melted easily while processing. Moreover, the raw material of the polyester used in the present invention is recycled polyester, which can effectively reduce carbon emissions and save energy to reduce pollution and burdens to Earth by reusing polyester material. Furthermore, the diol added in the alcoholysis of the method in the present invention can be diol derived form biomass resources, which is benefit to reduce the demand for petroleum energy to achieve the goal of environmental protection.

Although embodiments of the present disclosure and their advantages have been described in detail, they are not used to limit the present disclosure. It should be understood that various changes, substitutions and alterations could be made herein without departing from the spirit and scope of the present disclosure. Therefore, the protecting scope of the present disclosure should be defined as the following claims.

What is claimed is:

1. A method for preparing a copolyester-ether film, comprising:
    (A) providing a recycled polyethylene terephthalate (PET);
    (B) performing alcoholysis by reacting the recycled PET with 1,4-butanediol to form a first intermediate, wherein the first intermediate has a degree of alcoholysis not less than 80%, and the molar ratio of the recycled PET to 1,4-butanediol is 1:1.8-2.5;
    (C) performing transesterification to the first intermediate to form a second intermediate, wherein the transesterification is performed at a temperature of 190-230° C., thereby a butoxy ($C_4H_6O$) segment was partially introduced into the ethoxy ($C_2H_4O$) segment of PET;
    (D) adding polyethylene glycol to the second intermediate and performing polymerization to form a copolyester-ether, wherein the weight percent of polyethylene glycol in the copolyester-ether is 24-55%; and
    (E) manufacturing the copolyester-ether into a flexible film, wherein excess 1,4-butanediol is removed after the transesterification in the step (C), a weight percentage of the ethoxy segment in the copolyester-ether is 1.5 wt. % to 3.1 wt. %.

2. The method of claim 1, wherein 1,4-butanediol in the step (B) is derived from biomass resources.

3. The method of claim 1, wherein the alcoholysis in the step (B) is performed at a temperature of 190-200° C. for 3-5 hours.

4. The method of claim 1, wherein the transesterification in the step (C) further comprises adding a transesterification catalyst, and the transesterification catalyst is a titanium compound, a tin compound, an antimony compound, a monovalent metal compound, a divalent metal compound, or combinations thereof.

5. The method of claim 1, wherein the step of removing excess 1,4-butanediol is performed by vacuum extraction.

6. The method of claim 1, wherein the polymerization in the step (D) further comprises adding a polymerization catalyst, and the polymerization catalyst is an antimony compound, a germanium compound, a magnesium compound, a manganese compound, a phosphorus compound, a nitrogen compound, an organic peroxide, or combinations thereof.

7. The method of claim 1, wherein the copolyester-ether in the step (D) has a melting point between 150° C. to 200° C. and a glass transition temperature between −40° C. to −20° C.

8. The method of claim 1, wherein the flexible film in the step (E) has a Young's modulus of 60-210 MPa.

9. The method of claim 1, wherein the flexible film in the step (E) has a water vapor transmission rate of 600-6000 $g/m^2$/day.

* * * * *